(12) United States Patent
Ng

(10) Patent No.: US 10,869,805 B2
(45) Date of Patent: Dec. 22, 2020

(54) SYSTEM AND METHOD FOR PROVIDING NAVIGATION INFORMATION

(71) Applicant: Fruit Innovations Limited, Wanchai (HK)

(72) Inventor: Kin Siu Ng, Wanchai (HK)

(73) Assignee: Fruit Innovations Limited, Wanchai (HK)

( * ) Notice: Subject to any disclaimer, the term of this patent is extended or adjusted under 35 U.S.C. 154(b) by 70 days.

(21) Appl. No.: 15/126,771

(22) PCT Filed: Mar. 9, 2015

(86) PCT No.: PCT/CN2015/073859
§ 371 (c)(1),
(2) Date: Sep. 16, 2016

(87) PCT Pub. No.: WO2015/139566
PCT Pub. Date: Sep. 24, 2015

(65) Prior Publication Data
US 2017/0165147 A1    Jun. 15, 2017

(30) Foreign Application Priority Data
Mar. 21, 2014    (HK) .................. 14102851

(51) Int. Cl.
*A61H 3/06*    (2006.01)
*G01C 21/36*    (2006.01)
*G01S 5/02*    (2010.01)

(52) U.S. Cl.
CPC ............. *A61H 3/061* (2013.01); *A61H 3/066* (2013.01); *G01C 21/3641* (2013.01); *G01S 5/0284* (2013.01); *A61H 2003/063* (2013.01)

(58) Field of Classification Search
CPC .. A61H 2003/063; A61H 3/061; A61H 3/066; G01C 21/3641; G01S 5/0284; G09B 21/007
USPC ....... 701/409–411, 534; 340/539.22, 539.26, 340/568.1, 572.1
See application file for complete search history.

(56) References Cited

U.S. PATENT DOCUMENTS 5,470,233 A * 11/1995 Fruchterman .... G08G 1/096861
340/4.14
6,705,525 B2 * 3/2004 Krichever .............. G02B 5/285
235/462.01

(Continued)

OTHER PUBLICATIONS

Willis, Scooter & Helal, Sumi, RFID Information Grid for Blind Navigation and Wayfinding, Proceedings of the 2005 Ninth IEEE International Symposium on Wearable Computers (ISWC'05) (Year: 2005).*

(Continued)

*Primary Examiner* — Cuong H Nguyen
(74) *Attorney, Agent, or Firm* — Renner Kenner Greive Bobak Taylor & Weber

(57) ABSTRACT

A system and method for providing navigation information including the steps of detecting a proximate object to a referenced location, transmitting the referenced location to the proximate object, wherein the referenced location is arranged to be processed to derive a location of the proximate object, and where guidance information is available for the referenced location, transmitting the guidance information to the proximate object.

23 Claims, 10 Drawing Sheets

(56) References Cited

U.S. PATENT DOCUMENTS

| | | | |
|---|---|---|---|
| 7,039,522 B2* | 5/2006 | Landau | A61H 3/061 340/539.11 |
| 7,463,142 B2* | 12/2008 | Lindsay | A61B 5/00 340/539.12 |
| RE44,408 E* | 8/2013 | Lindsay | A61B 90/98 340/539.12 |
| 8,588,464 B2* | 11/2013 | Albertson | A61H 3/061 340/435 |
| 8,751,153 B2* | 6/2014 | Hurley | G01C 21/32 701/410 |
| 8,849,563 B2* | 9/2014 | Hurley | G06Q 10/08355 701/410 |
| 8,994,841 B2* | 3/2015 | Oshima | H04B 10/541 348/211.99 |
| 9,087,349 B2* | 7/2015 | Oshima | H04N 5/2352 |
| 9,088,360 B2* | 7/2015 | Oshima | H04B 10/116 |
| 9,094,120 B2* | 7/2015 | Oshima | H04N 5/2353 |
| 9,143,339 B2* | 9/2015 | Oshima | H04N 3/1506 |
| RE45,766 E* | 10/2015 | Lindsay | A61B 90/98 |
| 9,166,810 B2* | 10/2015 | Oshima | H04N 5/232933 |
| 9,455,768 B2* | 9/2016 | Griffin | H04B 5/0031 |
| 9,824,250 B2* | 11/2017 | Jones | G06K 7/10366 |
| 9,972,216 B2* | 5/2018 | Chen | G09B 21/006 |
| 2003/0034398 A1* | 2/2003 | Krichever | G02B 5/285 235/462.35 |
| 2005/0099291 A1* | 5/2005 | Landau | A61H 3/061 340/539.13 |
| 2005/0148828 A1* | 7/2005 | Lindsay | A61B 5/00 600/300 |
| 2006/0129308 A1* | 6/2006 | Kates | A61H 3/061 701/532 |
| 2008/0170118 A1* | 7/2008 | Albertson | A61H 3/061 348/46 |
| 2011/0070825 A1* | 3/2011 | Griffin | H04B 5/0031 455/41.1 |
| 2013/0231857 A1* | 9/2013 | Beaurepaire | G01C 21/20 701/428 |
| 2013/0330088 A1* | 12/2013 | Oshima | H04B 10/116 398/130 |
| 2013/0332018 A1* | 12/2013 | Kim | G05D 1/0238 701/22 |
| 2014/0186026 A1* | 7/2014 | Oshima | H04B 10/516 398/25 |
| 2014/0192185 A1* | 7/2014 | Oshima | H04N 5/2352 348/135 |
| 2014/0379251 A1* | 12/2014 | Tolstedt | A61H 3/068 701/411 |
| 2015/0123770 A1* | 5/2015 | Jones | G06K 7/10366 340/10.1 |
| 2015/0153181 A1* | 6/2015 | Gildfind | G01C 21/206 701/408 |

OTHER PUBLICATIONS

RFID Based Indoor Navigational Aid for Persons with Severe Visual Impairments; Andrew Y. J. Szeto ; Satish K. Sharma; 2007 29th Annual International Conference of the IEEE Engineering in Medicine and Biology Society; IEEE Conference Paper . (Year: 2007).*

SoundView: An auditory guidance system based on environment understanding for the visually impaired people; Min Nie ;et al.; 2009 Annual International Conference of the IEEE Engineering in Medicine and Biology Society; IEEE Conference Paper. (Year: 2009).*

An indoor navigation architecture using variable data sources for blind and visually impaired persons; João Pedro Gomes ; João Paulo Sousa ; Carlos R. Cunha ; Elisabete Paulo Morais; 2018 13th Iberian Conference on Information Systems and Technologies (CISTI); IEEE Conference Paper. (Year: 2018).*

Indoor Navigational Aid System for the Visually Impaired; M. Sarfraz ; S.M. Ali J. Rizvi; Geometric Modeling and Imaging (GMAI '07) ; IEEE Conference Paper. (Year: 2007).*

* cited by examiner

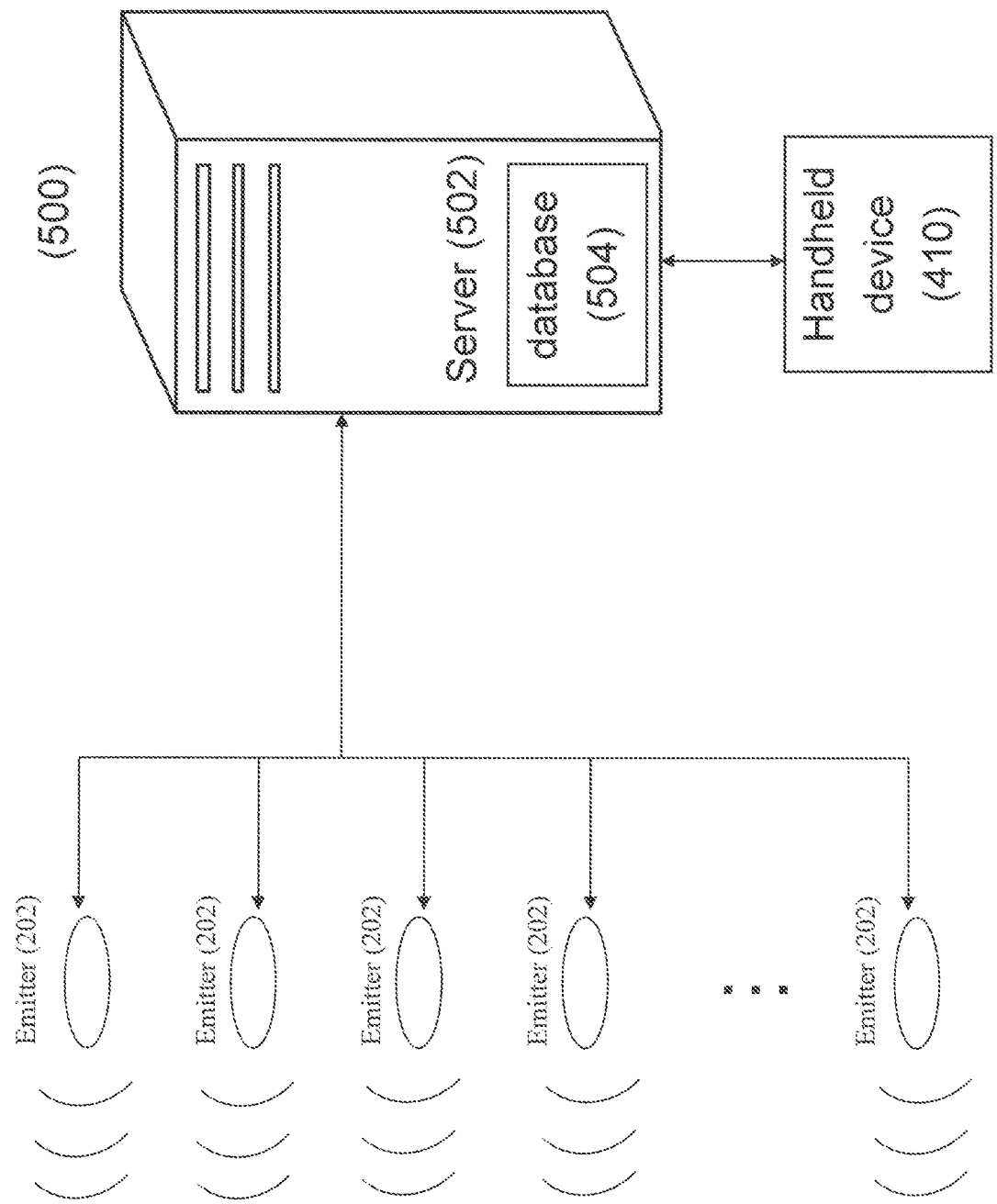

SYSTEM AND METHOD FOR PROVIDING NAVIGATION INFORMATION

TECHNICAL FIELD

The present invention relates to a system for providing navigation information and particularly, although not exclusively, to a system for providing navigation information for persons with visual impairment.

BACKGROUND

A commonly used tool to present directional or guidance information to users or patrons is to use visual signage or reference points so as to communicate guidance and location information to users. However, for people with visual impairment, visual signage may not be useful or offer any significant assistance and thus there is a need for an alternative form of navigational assistance.

Tactile signage such as tactile tiles paved on floor surfaces may be one possible solution to assist visually impaired persons with navigation. These tactile signs may have a predefined shape and layout which provide a tactile feel to a user when the user steps or touches the tile. Whilst these tactile signs are helpful in providing reference information, they are limited in the assistance rendered to users.

One such limitation of tactile signs is that a tactile tile or sign may only provide passive navigation information to people who steps on to it. That is, the tactile tile may only indicate a boundary or at best, provide a directional indicator to the user. As such, to effectively use these tactile signs, persons with visual impairment may have to learn and memorize the routes before they are able to utilise the tactile signage to reach a destination. In turn, this causes new areas to be inaccessible or at least difficult for these persons.

SUMMARY OF THE INVENTION

In accordance with a first aspect of the present invention, a smart tag is integrated in a conventional tactile tiles, the smart tag can be but not limited to a RFID tag, 1D barcode or 2D barcode.

In an embodiment of the first aspect, in additional to simple direction information provided by tactile signs, the smart tag further provide complicated information to the proximate object, such information can be but not limited to public facilities nearby, direction to help centre and direction to exit.

In an embodiment of the first aspect, the information can be but not limited to read by a RFID reader, barcode reader and/or video camera.

In an embodiment of the first aspect, the smart tag can be integrated in general tiles, wall and ceiling.

In other embodiment, the smart tag can be an active transmitter which can bidirectional communicate to the proximate object, create mesh network with other smart tag, and collect information from central controller.

In accordance with a second aspect of the present invention, there is provided a method for providing navigation information comprising the steps of:
  detecting a proximate object to a referenced location;
  transmitting the referenced location to the proximate object, wherein the referenced location is arranged to be processed to derive a location of the proximate object; and
  where guidance information is available for the referenced location, transmitting the guidance information to the proximate object.

In an embodiment of the second aspect, the guidance information further includes information associated to a plurality of location attributes of the referenced location.

In an embodiment of the second aspect, further comprising the step of:
  receiving an input location;
  processing the input location; and
  where direction information is available for the input location, transmitting the guidance information including direction information to the proximate object.

In an embodiment of the second aspect, further comprising the step of:
  processing a plurality of attributes of the proximate object associated to the referenced location; and
  updating the direction information.

In an embodiment of the second aspect, transmitting the guidance information to the proximate object further comprising the steps of:
  transmitting the guidance information to a handheld device; and
  transmitting the guidance information to the proximate object via the handheld device.

In an embodiment of the second aspect, the guidance information is transmitted to the proximate object is at least one of an acoustic signal, a visual signal, a tactile signal, a physical spike or an electrical pulse.

In an embodiment of the second aspect, the referenced location is transmitted in an RF signal.

In an embodiment of the second aspect, the protocol for the RF communication can be but not limited to BLUETOOTH®, ZIGBEE®, Z-WAVE®, or WI-FI®.

In an embodiment of the second aspect, the referenced location is transmitted in a magnetic signal.

In an embodiment of the second aspect, magnetic signal can be generated by permanent magnet, ferrite core coil or coreless coil.

In an embodiment of the second aspect, the referenced location is transmitted in an optical signal.

In an embodiment of the second aspect, the optical signal can be generated by LED or Laser diode In an embodiment of the second aspect, the optical signal is transmitted in a spectrum visible or invisible to human eyes.

In an embodiment of the second aspect, the detector module further includes an optical bandpass filter arranged to enhance a signal-to-noise of the optical signal by filtering out a background optical noise of the optical signal. In an embodiment of the second aspect, the optical signal is detected by an optical detector optimized for detecting the optical signal.

In an embodiment of the second aspect, the referenced location is transmitted from a transmitter positioned on at least one of a floor, a wall or a ceiling.

In an embodiment of the second aspect, the referenced location is transmitted from a transmitter embedded in at least one of a floor, a wall or a ceiling.

In an embodiment of the second aspect, the referenced location is transmitted to a detector engaged to the proximate object.

In accordance with a third aspect of the present invention, there is provided a system for providing navigation information comprising:
  a detector module for detecting a proximate object to a referenced location;
  a transmitter module for transmitting the referenced location to the proximate object;

a controller module arranged to process the referenced location to derive a location of the proximate object; and where guidance information is available for the referenced location, the controller module is arranged to transmit the guidance information to the proximate object.

In an embodiment of the third aspect, the guidance information further includes information associated to a plurality of location attributes of the referenced location.

In an embodiment of the third aspect, further comprising:
an input module receiving an input location;
wherein the controller module is arranged to process the input location; and
where direction information is available for the input location, the controller module is arranged to transmit the guidance information including direction information to the proximate object.

In an embodiment of the third aspect:
the controller module is further arranged to process a plurality of attributes of the proximate object associated to the referenced location; and
where updated direction information is available for the input location, the transmitter module is arranged to transmit the guidance information including updated direction information to the proximate object.

In an embodiment of the third aspect:
the detector module is arranged to transmit the guidance information to a handheld device; and
the handheld device is arranged to transmit the guidance information to the proximate object.

In an embodiment of the third aspect, the guidance information is transmitted to the proximate object is at least one of an acoustic signal, a visual signal, a tactile signal, a physical spike or an electrical pulse.

In an embodiment of the third aspect, the referenced location is transmitted in an RF signal.

In an embodiment of the third aspect, the protocol for the RF communication can be but not limited to BLUETOOTH®, ZIGBEE®, Z-WAVE®, or WI-FI®.

In an embodiment of the third aspect, the referenced location is transmitted in a magnetic signal.

In an embodiment of the third aspect, magnetic signal can be generated by permanent magnet, ferrite core coil or coreless coil.

In an embodiment of the third aspect, the referenced location is transmitted in an optical signal.

In an embodiment of the third aspect, optical signal can be generated by LED or Laser diode In an embodiment of the third aspect, the optical signal is transmitted in a spectrum visible or invisible to human eyes.

In an embodiment of the third aspect, the detector module further includes an optical bandpass filter arranged to enhance a signal-to-noise of the optical signal by filtering out a background optical noise of the optical signal.

In an embodiment of the third aspect, the referenced location is transmitted from a signal transmitter positioned on at least one of a floor, a wall or a ceiling.

In an embodiment of the third aspect, the referenced location is transmitted from a signal transmitter embedded in at least one of a floor, a wall or a ceiling.

In an embodiment of the third aspect, the detector module is engaged to the proximate object.

In an embodiment of the third aspect:
the controller module is further arranged to process a plurality of attributes of a signal of at least one of the RF signal, the magnetic signal or the optical signal, and to derive a plurality of attributes of the proximate object associated to the reference location; and where updated direction information is available for the input location, the transmitter module is arranged to transmit the guidance information including updated direction information to the proximate object.

In an embodiment of the third aspect, the plurality of attributes of the signal includes a direction of the signal, a strength of the signal and a minuet change of the signal.

In an embodiment of the third aspect, the RF signal is at least one of a WI-FI® signal, a BLUETOOTH® signal, a UHF signal, a ZIGBEE® signal, a Z-WAVE® signal or an NFC signal.

In an embodiment of the third aspect, the detector module is at least one of a WI-FI® receiver/client, a BLUETOOTH® receiver, a RF receiver, an RFID reader, an RFID tagging device, a ZIGBEE® Communication module, a Z-WAVE® Communication module or an NFC reader/receiver.

In an embodiment of the third aspect, the magnetic signal is emitted by at least one of a permanent magnet tape, permanent magnet array, a ferrite core coil, or a coreless coil, a magnetic media, a magnetic tape, or an array of magnets.

In an embodiment of the third aspect, the detector module is at least one of a Hall effect sensor, a magnetic sensor or a microelectromechanical magnetic effect sensor.

In an embodiment of the third aspect, the optical signal is at least one of a barcode, a 2D barcode, an infra-red signal, or a visible light signal emitted by an LED or laser diode.

In an embodiment of the third aspect, the detector module is at least one of an optical code reader, a camera, an infra-red receiver, or an optical receiver.

In an embodiment of the third aspect, at least one of the detector module and the controller module is included in a handheld device.

In an embodiment of the third aspect, the handheld device is a smartphone or a tablet computer device.

In an embodiment of the third aspect, the handheld device is a custom-built device comprising the detector module and the controller module.

In an embodiment of the third aspect, the handheld device is arranged to transmit the guidance information to the proximate object via a stimulation pad attached to the handheld device.

In an embodiment of the third aspect, the controller module is arranged to derive a location of the proximate object by locating a record associated with referenced location in a database.

In an embodiment of the third aspect, the database is stored in a server accessible by the handheld device.

In an embodiment of the third aspect, the database is loaded in the handheld device.

In an embodiment of the third aspect, the transmitter module is included in a tag embedded in tactile tile arranged to provide tactile information.

In an embodiment of the third aspect, the tag is operable to bidirectional communicate with at least one of the proximate object, a central server, or another tag in the system.

In an embodiment of the third aspect, the tag module is arranged to communicate with at least one another tag to form a mesh network.

BRIEF DESCRIPTION OF THE DRAWINGS

Embodiments of the present invention will now be described, by way of example, with reference to the accompanying drawings in which:

FIG. 5 is an illustration showing a system for providing navigation information in accordance with another embodiment of the present invention.

DETAILED DESCRIPTION OF THE PREFERRED EMBODIMENT

Figure 1A:
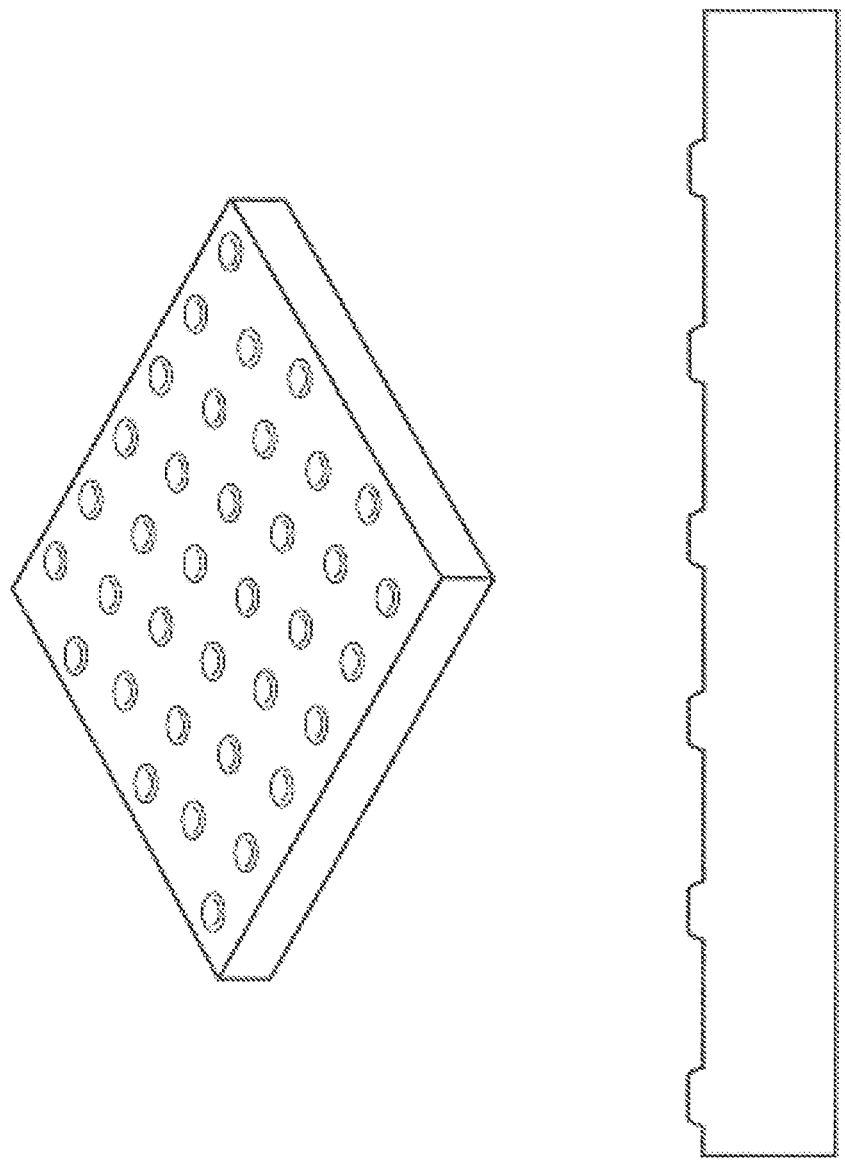
FIG. 1A is a diagram showing an example of tactile positional tile with raised dots.
Figure 1B:
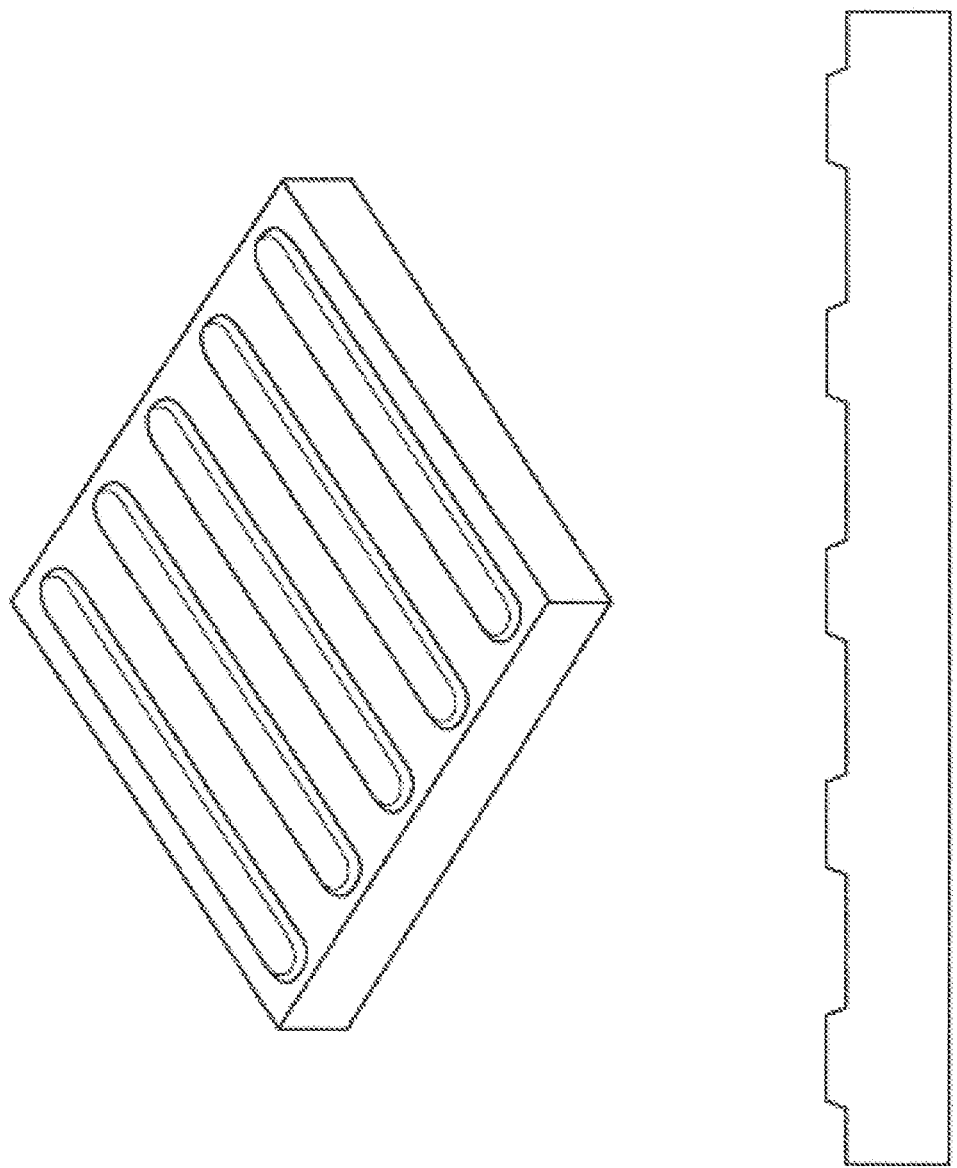
FIG. 1B is a diagram showing an example of tactile directional tile with raised bars.

Referring to FIG. 1A and FIG. 1B, there are illustrated two examples of tactile tiles which are paved on floor surfaces for providing navigation information to users with visual impairment. The raised dots or bars on these tiles provide a tactile sensation to a user when the users step on, or contacts the tactile tile, and the users are able to follow the navigation information provided and decide to walk, turn or stop accordingly. In practice, these tactile tiles may be paved onto a floor surface in a configuration as to indicate a path, boundary, edge and in turn, due to the configuration, provide a limited amount of directional assistance to users.

Figure 2A:
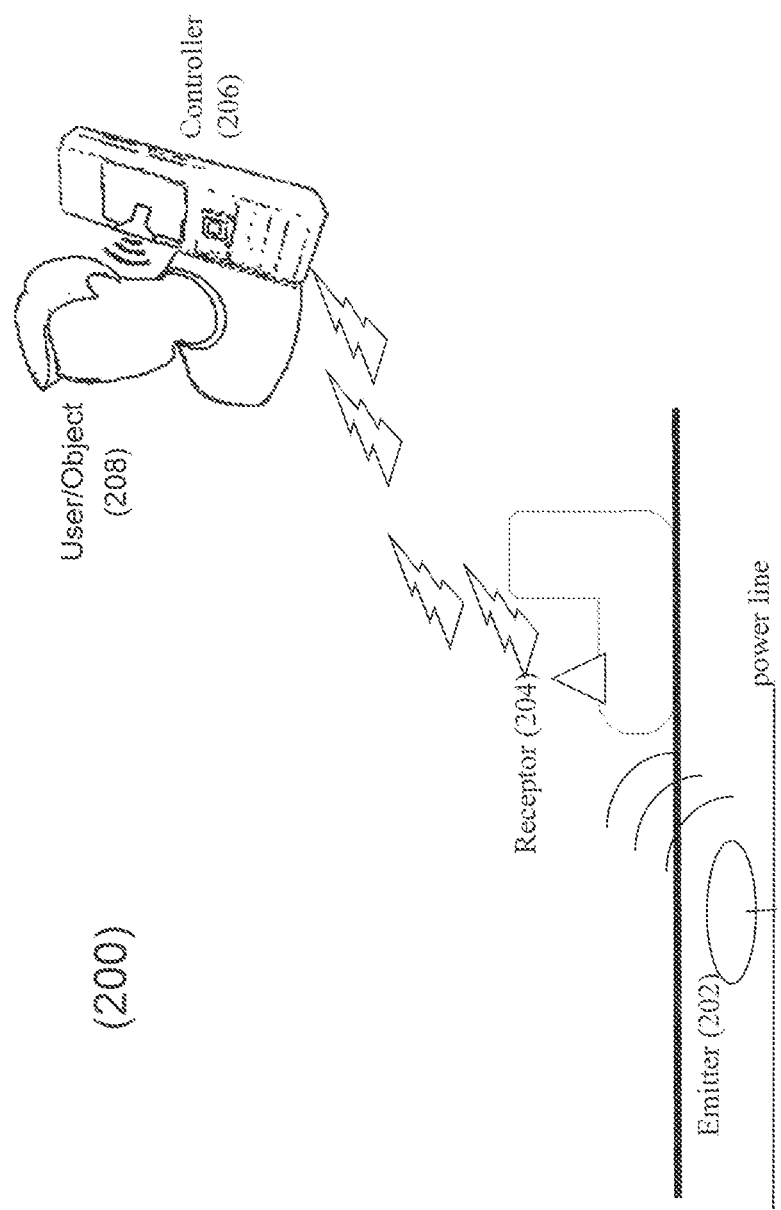
FIG. 2A is an illustration showing a system for providing navigation information in accordance with an embodiment of the present invention.
Figure 2B:
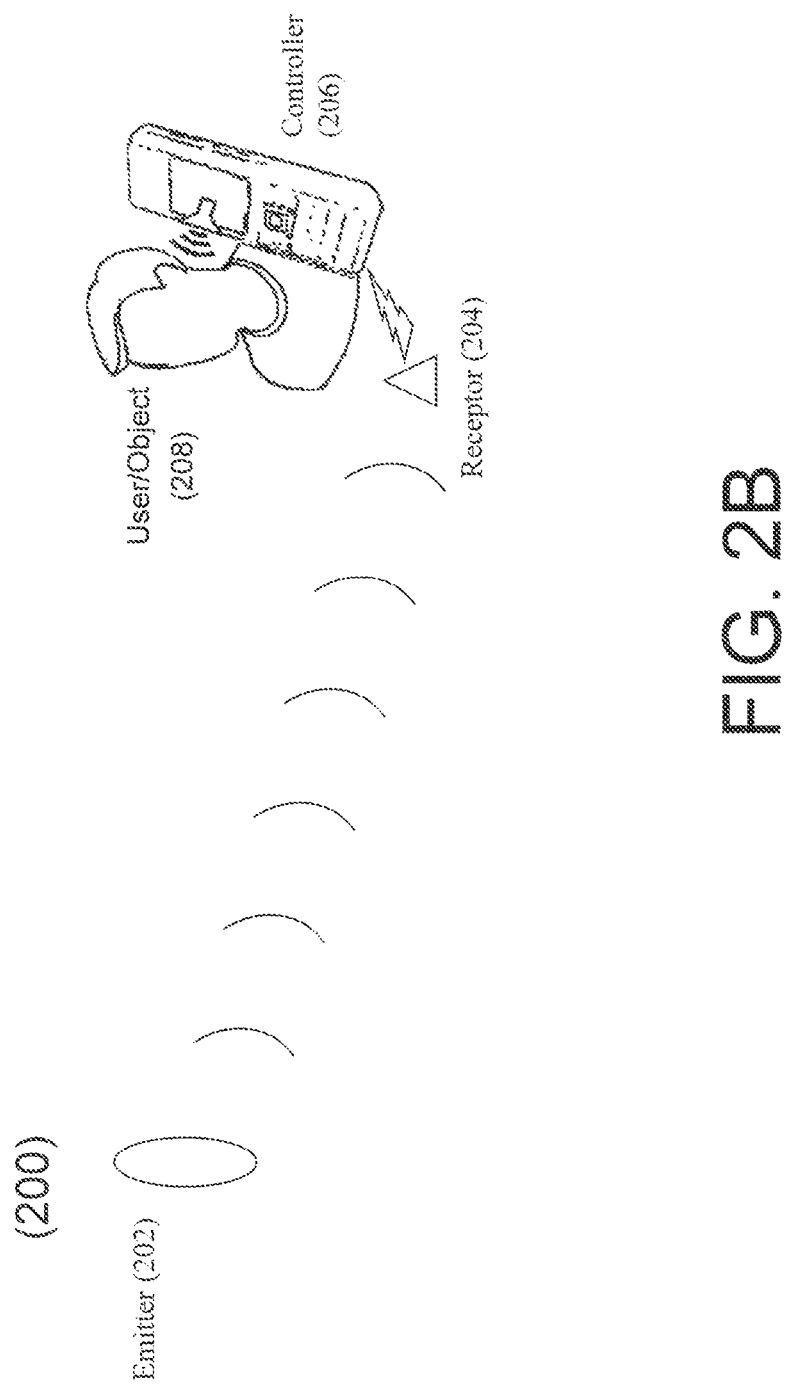
FIG. 2B is an illustration showing a system for providing navigation information in accordance with another embodiment of the present invention.
Figure 2C:
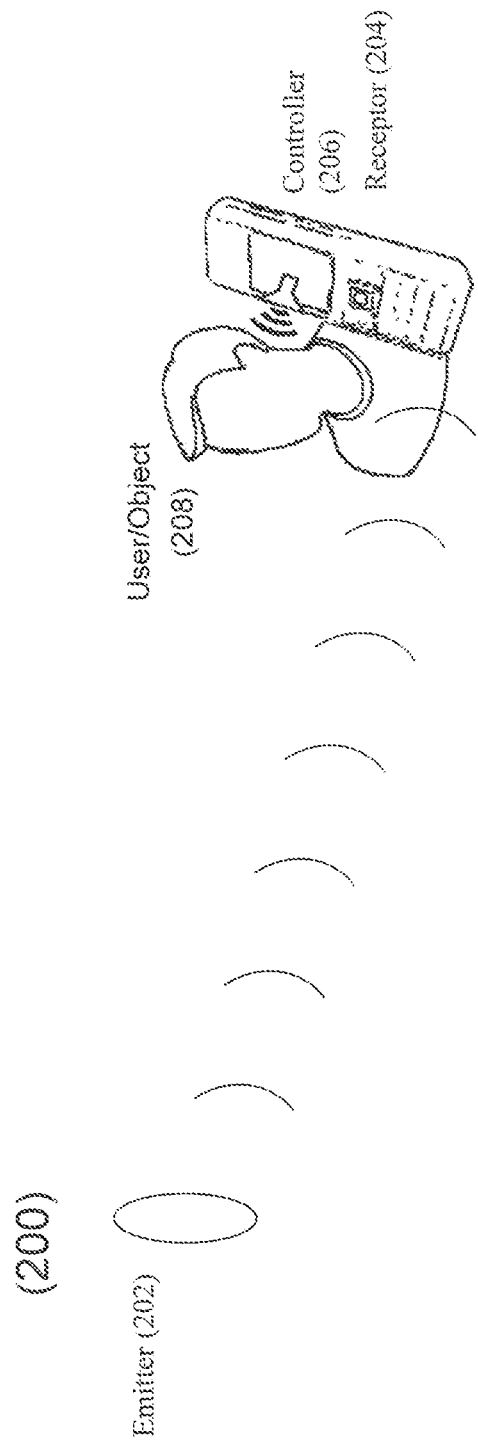
FIG. 2C is an illustration showing a system for providing navigation information in accordance with another embodiment of the present invention.

Referring to FIG. 2A to 2C, there is provided an embodiment of a system 200 for providing navigation information comprising: a detector module 204 for detecting a proximate object 208 to a referenced location; a transmitter module 202 for transmitting the referenced location to the proximate object 208; a controller module 206 arranged to process the referenced location to derive a location of the proximate object 208; and where guidance information is available for the referenced location, the controller module 206 is arranged to transmit the guidance information to the proximate object 208.

In this embodiment, the system 200 for providing navigation information includes a transmitter module 202, which may be a emitter 202 arranged to emit a signal, a detector module 204, which may be a receptor 204 arranged to receive or detect the signal from the emitter 202, and a controller module, which may be a controller 206 arranged to process the signal detected by the detector module 204. The controller is also operable to transmit guidance information to an object or a user 208, Preferably, the receptor 204 is operable to detect the signal emitted by the emitter 202 in a proximate location.

In one example embodiment, the emitter 202 is a small device being placed under a floor tile or any other suitable floor covering, powered by an external electricity source. The emitter 202 will be tuned to emit a detectable and differentiable signal. The differentiable signal, may in turn indicate that the reference location or the current location of the device and thus when the signal is received by a suitable reader, the location can be communicated to a user of the reader. As an example, should the device be deployed through out the floored surfaces of a shopping mall, the location information once read by a suitable reader would be able to tell the user 208 that the user is at an exit door, close to the information centre, in front of a toilet, etc.

In some embodiments, the emitter 202 may be positioned on or adjacent to a floor, a wall or a ceiling, or the emitter 202 may also be embedded in a floor, a wall or a ceiling, so as to emit the signal. Preferably, the emitter 202 may be powered by battery or portable power sources or obtain its power from an external power source, such as mains power grid or solar power.

As shown in this embodiment, a receptor 204 arranged to communicate with the emitter 202 is in the form of a small battery-powered device which is arranged to be placed on or in a shoe or any other apparatus of the user to listen and read the signal received from the emitter 202. Optionally, the receptor 204 includes additional functionality or logic capable of filtering out noise and incomplete signals, such as a suitable bandpass filter arranged to enhance a signal-to-noise of the signal by filtering out a background noise of the signal. Once the receptor detects a complete differentiable signal, it will interpret the signal as digitized information and relay the information to a designated controller 206. Alternatively, the receptor 204 may also repeat or transmit the signal to the controller 206.

Once the controller 206 receives the information, the controller 206 is arranged to process the information. For example, the information may be in form of a code which matches with a record associated with a reference location stored in a database, and the controller 206 is arranged to access the database and locate the record. The controller 206 may also be arranged to provide navigation information to the user 208.

The controller 206 may be a battery-powered device that interprets the digitized information transmitted by the receptor 204 and presents to the impaired person 208 as vocal guidance through a speaker or earphone. Other than a customized device having various electronic processing components, the controller may also be a computing device such as a smart phone having a customized software application. Optionally, background information about the environment may also be preloaded or downloaded such that the controller 206 can use the digitized information retrieved by the receptor 204 to provide additional informative guidance.

The controller 206 may also derive a location according to the signal repeated by the receptor 204 being process by the controller 206 and provide guidance information to the user 208. The guidance information may also be an acoustic signal, a visual signal, a tactile signal, a physical spike or an electrical pulse which can be felt, heard or experienced by the user.

In one alternative embodiment, the receptor 204 is attached to an attachment of the user 208, such as a guiding post or stick of a person with visual impairment. The receptor may also be attached or engaged to any part of the user 208. Alternatively, the receptor 204 is included in a handheld device such as a smart phone or a tablet computer.

In another embodiment, the system 200 of providing navigation information may further comprises: an input module receiving an input location; wherein the controller module is arranged to process the input location; and where direction information is available for the input location, the controller module is arranged to transmit the guidance information including direction information to the proximate object.

For example, a user 208 may input a destination with the input module. Subsequently, the controller 206 may process the destination and the reference location to obtain a path for the user 208 to follow, and then the path is provided to the user by proving direction information to the user 208 so as to guide the user 208 to arrive at the destination from the reference location.

Figure 2D:
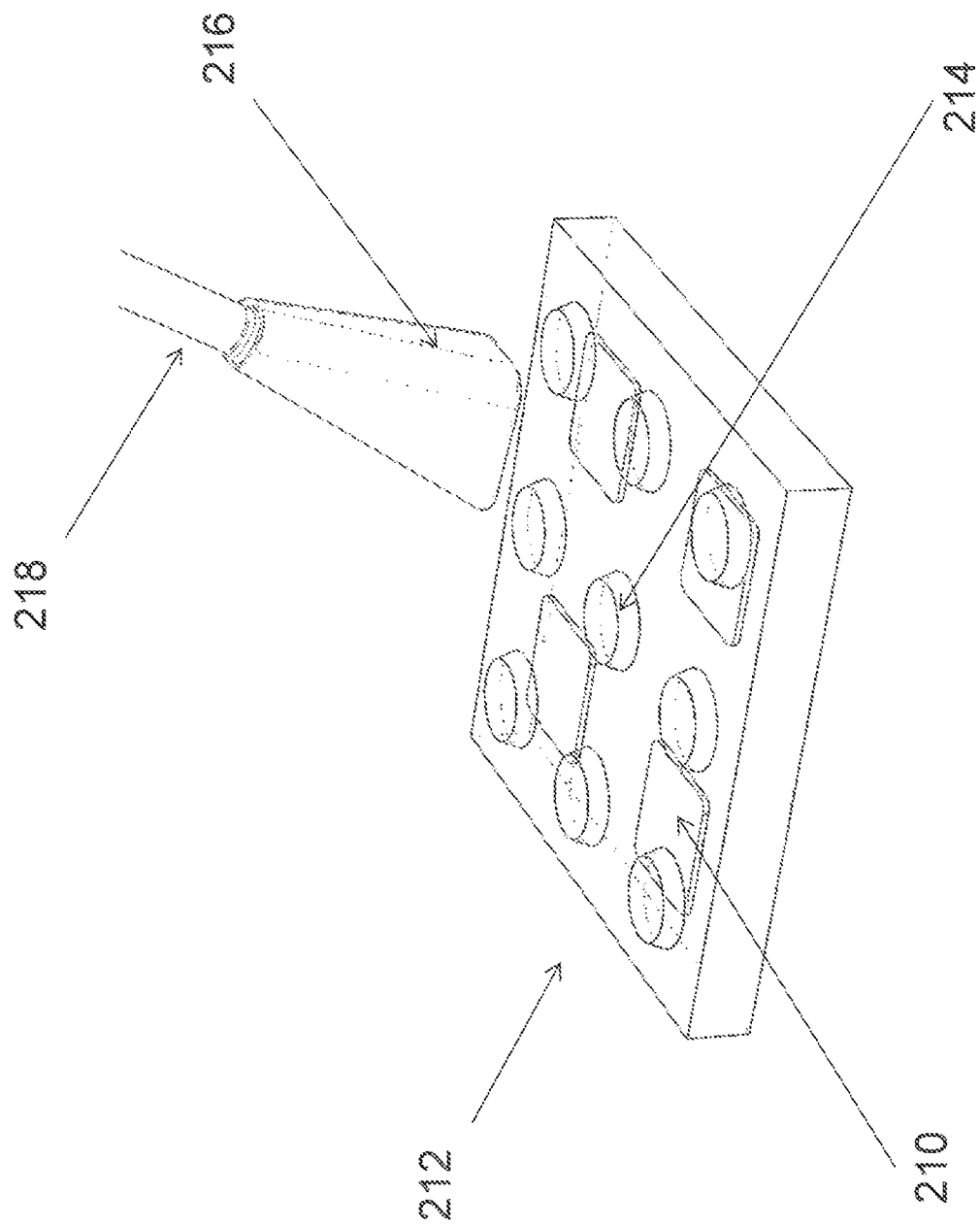
FIG. 2D is an illustration showing a system for providing navigation information in accordance with another embodiment of the present invention.

Referring to FIG. 2D, there is shown an embodiment of a system for providing navigation information in accordance with another embodiment of the present invention. In this embodiment, a passive RFID tag 210 with preprogramed information is embedded inside the tactile tile 212. The raised dot 214 or bar provides function as standard tactile tile, and the RFID 210 provide more detail information. The preprogramed information on RFID 210 includes the public facilities nearby, direction to the service centre or direction to exit.

The communication distance of the passive RFID 210 can range from 5 cm to 150 cm, a long distance RFID has advantage of coverage, but has larger tolerance on guiding user. Preferably, accurate guiding is preferred for persons with visual impairment, a short distance RFID tag is then preferred to use. Signal coverage issues for short distance RFID can be solved by using array or matrix of RFID tag. The resolutions of the system controlled by the group size for the RFID tag, but not limited by the size of the tactile tile.

The RFID 210 embedded tactile tile 212 may be paved onto a floor, the programmed information should according to its location. And on site reprogram is allowed if the information on the RFID tag 210 needs to be revised.

The RFID tag 210 can carry more than single information, for example, a single RFID embedded tactile tile 212 can indicate there is a food court, restroom and escalator to transportation station nearby.

The information on the RFID tag is read by a battery powered RFID reader. Referring to FIG. 2D, the RFID reader 216 is attached on a stick 218, it can also be attached on the shoes or any accessories close to the floor.

The RFID reader 216 is wire or wireless communicate with a human interface device which convert the information to an acoustic signal, a visual signal, a tactile signal, a physical spike, an electrical pulse or any form of signal can be identified by the user.

The wireless communication can be but not limited to based on WI-FI®, BLUETOOTH®, ZIGBEE®, Z-WAVE® or IrDA communication protocol. In accordance to the protocol used in the wireless communication, the detector module may be implemented as one of a WI-FI® receiver/client, a BLUETOOTH® receiver, an IR receiver, a ZIGBEE® Communication module, or a Z-WAVE® Communication module.

Figure 2E:
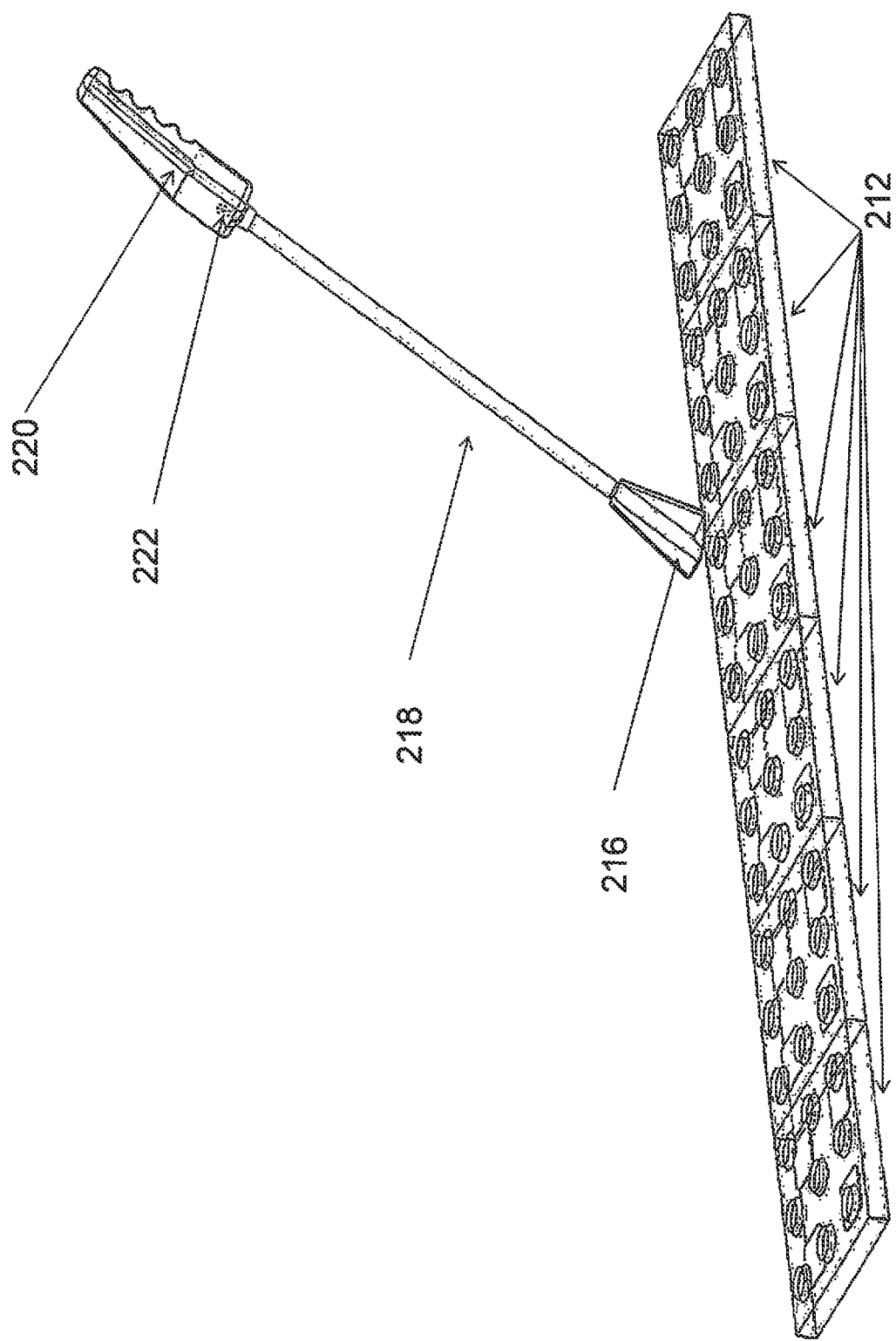
FIG. 2E is an illustration showing a system for providing navigation information in accordance with another embodiment of the present invention.

With reference to FIG. 2E, in one example embodiment, the RFID reader 216 is powered by the battery pack 220 integrated in the stick handle 222. The battery pack 220 can be replaceable or rechargeable battery.

Preferably, a controller 206 is integrated in the stick handle 222, which can process the information from the RFID reader 216 and convert the information to an acoustic signal, a visual signal, a tactile signal, a physical spike, an electrical pulse or any form of signal can be identified by the user.

Figure 3:
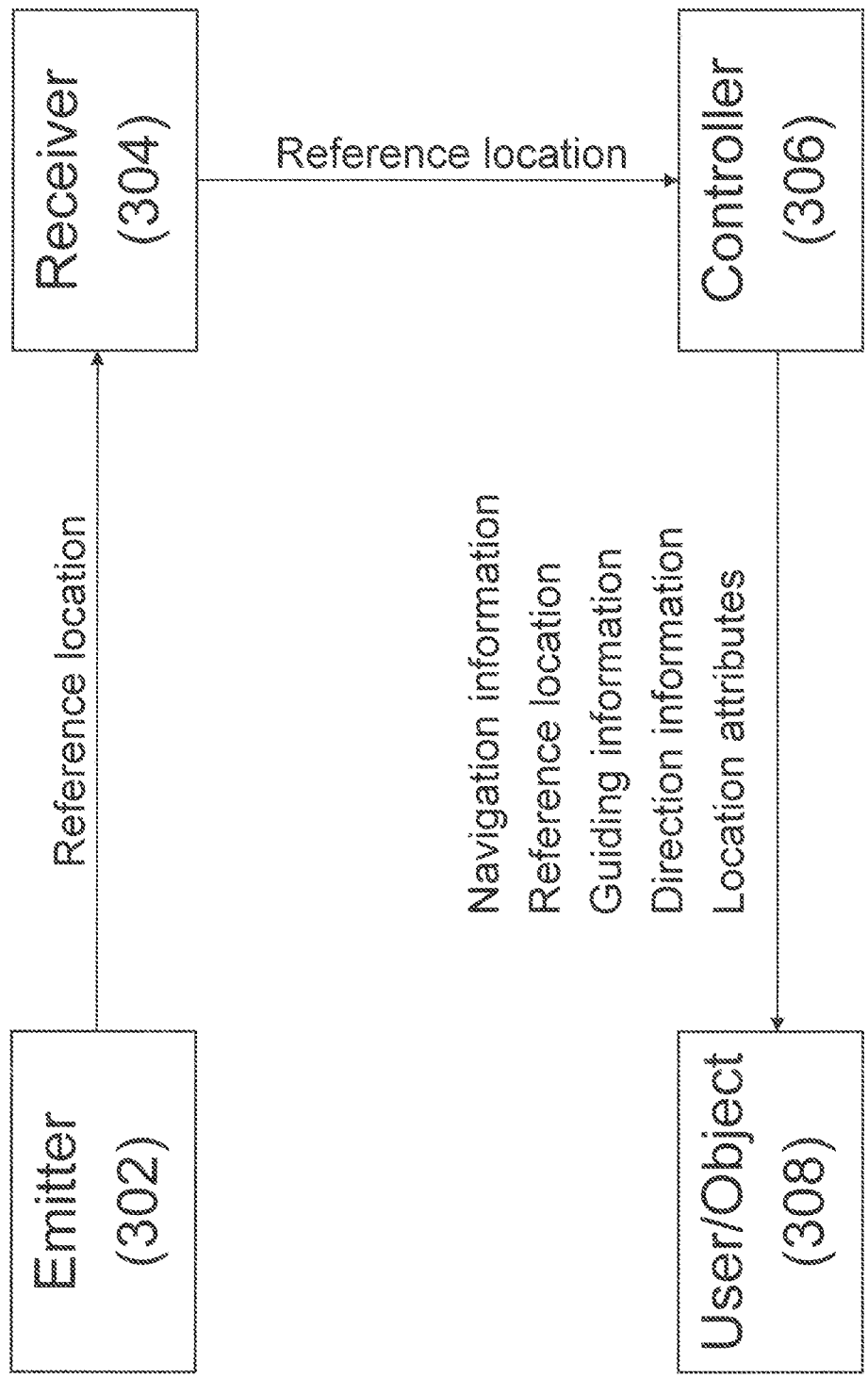
FIG. 3 is a block diagram showing the operation of the system for providing navigation information of FIG. 2.

FIG. 3 is a block diagram showing the operation of an embodiment of the system for providing navigation information as shown in FIGS. 2A to 2C. In some examples, a signal emitted by emitter 302 contains reference location information. When a receiver 304, which may be equivalent or similar to a receptor 204, detects a signal emitted from the emitter 302 (which may be similar or equivalent to an emitter 202), the receiver 304 passes the location information to a controller 306. The controller 306 may then be arranged to process the reference location information and derive a location of a proximate object and provide navigation information to a user 308.

Preferably, the navigation information may include the reference location of the emitter 302 or the receiver 304, guidance information for the reference location, or information associated to a plurality of location attributes of the referenced location. These location attributes may be a warning signal to the user 308, or an indicator of the type or properties of the location (e.g. the location is an information centre, a male/female washroom or an exit of a building, etc). Optionally, direction information may also be provided to the user 308.

In another preferred embodiment, a receiver 404 and a controller 406 is implemented in a handheld device 410, which can be a smart phone or a tablet computer or any other electronic devices without deviating from the spirit of the invention. In this embodiment, when a receiver 404 in the handheld device 410 detects a signal emitted from the emitter 402. The controller 406, which may be implemented within the handheld device 410, is arranged to process the reference location information and derive a location of a proximate object, and provide navigation information to a user 408.

In one embodiment, accessories 412 associated with the handheld device 410 may also complement the handheld device 410 to provide navigation information to the user 408. Preferably, accessory 412 may be an add-on stimulating pad which provides vibrations, physical spikes or slight electrical pulses to the user 408, such that the user 408 can sense the navigation information from the spikes or the electrical pulses. Alternatively, accessory 412 may also provide at least one of an acoustic signal, a visual signal, or a tactile signal to the user 408.

Preferably, the accessory 412 is wirelessly connected to the handheld device 410 such as by WI-FI®, BLUETOOTH® or any other wireless communication system or protocol. Alternatively, the accessory 412 is connected to the handheld device 410 by a communication cable.

With reference to FIGS. 2B and 2C, the emitter 202 may be implemented as a WI-FI® or a BLUETOOTH® Access Points, and the referenced location is transmitted with a Radio Frequency (RF) signal. For example, the emitter 202 may be available at every localities requiring positional identification, the emitter 202 should adequately cover the travel distance during the user's maneuvering between positions such that real-time information can be feed to the user's receiving device or smart phone. Optionally, the emitter 202 may be able to trigger the launch of a software application of the user's smart phone within the area of application of the system.

Preferably, the handheld device attached to a user 208 may comprise receptors 204 such as WI-FI®/BLUETOOTH® receiver/transceiver to communicate with the WI-FI®/BLUETOOTH® receiver/transceiver 202 arranged to transmit WI-FI®/BLUETOOTH® signals. Alternatively, in some example embodiments, the emitter 202 may include a Radio-Frequency (RF) transmitter, and the referenced location is transmitted in an RF signal. The emitter may be embedded into floor, wall or ceiling. Advantageously, the emitter 202 is suitable for wide-range public broadcasting in building premises. As an example embodiment, the emitter 202 may include an RF transmitter and an RF antenna arranged to transmit the RF signal to a receptor 204 implemented as an RF receiver. Alternatively, in some example embodiments, the emitter is placed on or under the floor, as shown in FIG. 2A. Preferably, the receptor 204 or the user mobile receiving device may be equipped on the lower part of the body, leg(s) or installed in the shoe(s) of the user; and may also be added on the guiding post of the person with visual impairment.

The handheld device attached to a user 208 may also comprise receptors 204 such as RF receiver/transceiver to communicate with the RF transmitter 202 arranged to transmit RF signals.

In some example embodiments, the emitter 202 may be implemented as a Radio Frequency Identification (RFID) (active or UHF) reader or an RFID tagging device, and the referenced location is transmitted in an RF signal. Preferably, an RFID tagging device operable to communicate the stored information with an RFID reader. The emitter 202 is arranged to be embedded into floor, wall or ceiling. As an example embodiment implemented with RFID technology, emitter 202 may be a UHF RFID tag arranged to communicate with receptor 204 which may be a UHF RFID reader.

In yet another embodiment, the emitter 202 is implemented as a Near Field Communication (NFC) transmitter/receiver, and the referenced location is transmitted in an RF signal. As an example embodiment implemented with NFC technology, emitter 202 may be an NFC tag arranged to communicate with receptor 204 which may be a NFC reader.

Alternatively, in some example embodiments, the emitter 202 is implemented as a magnetic media, and the referenced location is transmitted in a magnetic signal. The emitter 202 may be arranged in a single magnet or in a form of array of magnets with appropriate and sufficient field strength, the emitter 202 and/or the receptor 204 are operable to define direction identification of magnetism. The emitter 202 is arranged to be embedded on the floor or place on the floor (for magnetic tapes) of the application area, as shown in FIG. 2A. The emitter 202 may be a permanent magnet, an electro-magnet, a ferrite core coil, a coreless coil, or any other types of magnetic field emitter as known by a person skill in the art.

Preferably, the handheld device attached to a user 208 may comprise receptors 204 such as microelectromechanical system (MEMS) for receiving the magnetic signals emitted by a magnetic media 202. Alternatively, the handheld device may comprise receptors such as magnetic sensors and Hall effect sensors for receiving the magnetic signals emitted by a magnetic media 202.

Referring back to FIGS. 2B and 2C, in some example embodiments, the emitter 202 is implemented as a barcode, a 2D barcode or a QR code tag, and the referenced location is transmitted in an optical signal. The emitter 202 may be in fluorescent, invisible or reflect media, accordingly, receptor 204 such as an optical code reader or a camera may equipped with special filter, such as but not limited to a bandpass filter, for enhancement of detecting the particular wavelength the optical signal.

Alternatively, in some example embodiments, the emitter 202 is implemented as an infra-red signal transmitter, or an LED signal transmitter, and the referenced location is transmitted in an optical signal. The signals may be sent through an array of LED on floor, wall or ceiling. Receptor 204 with optical receiver and/or modulator may receive the referenced location from the emitter 202.

Preferably, the handheld device attached to a user may comprise receptors 204 such as lens/camera or photodetectors for receiving optical signals transmitted by an optical signal emitter 202.

Figure 4:
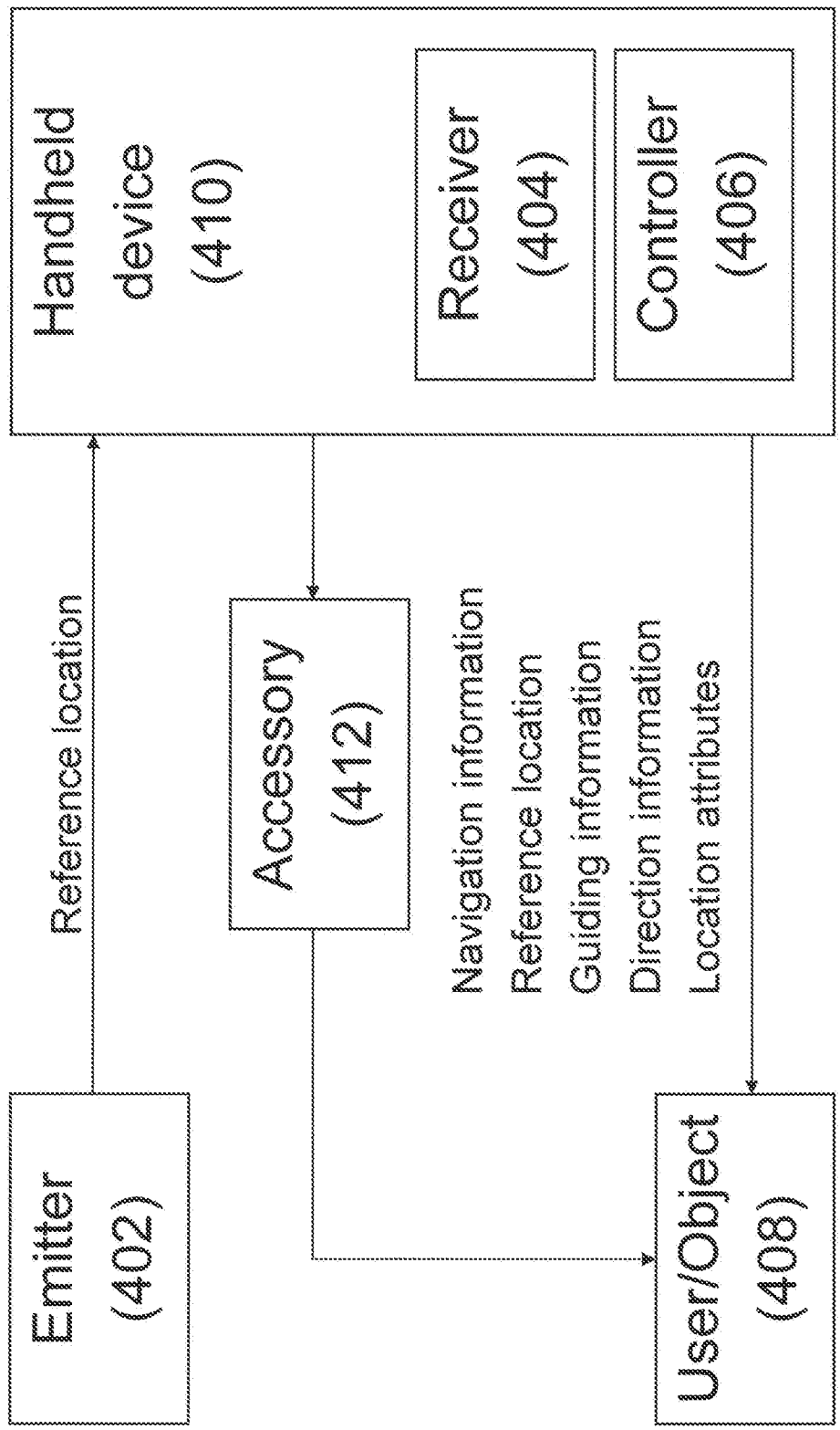
FIG. 4 is a block diagram showing another operation of the system for providing navigation information in accordance with another embodiment of the present invention.

With reference to FIG. 4, a user mobile receiving device may be used to receive the signals emitted by the emitter 402 and operate according to the previous embodiments. Preferably, the user mobile receiving device is a handheld device 410. Additionally, the user mobile receiving device 410 may also include integrated circuit chip on board, integrated circuit board and battery power supply, controller 406, etc.

Preferably, the receptor 404 or the user mobile receiving device 410 is able to detect a plurality of attributes of the proximate object associated to the referenced location including the direction, strength and minute changes of electrical, RF, or magnetic field of the signal emitted by the emitter 402. Advantageously, the controller module 406 is further arranged to process a plurality of attributes of the proximate object associated to the referenced location; and where updated direction information is available for the input location, the transmitter module is arranged to transmit the guidance information including updated direction information to the proximate object.

In this embodiment, the receptor 404 or the user mobile receiving device 410 is able to identify optical image to a certain level of resolution and is able to detect particular wavelength, e.g. infra-red or ultraviolent, etc. whether or not by using of special filter with the lens or camera. In some other embodiments, the receptor 404 or the user mobile receiving device 410 may be able to receive LED transmitted WI-FI®/BLUETOOTH® signals.

Preferably, the receptor 404 is capable of transmitting sensing signal to a handheld device 410 via BLUETOOTH®, WI-FI® or infra red signal.

The handheld device 410 may comprise special software application ("Apps") required to receive, interpret and process sensing signal from the device and be able to output adequate signals, either in one of or the combined form of sound, visual or touch senses, etc., by using the smart phone. For example, the "Apps" may be installed in a handheld device such as a smartphone or a tablet computer device. Alternatively, the handheld device 410 is custom-built and may comprise the receptor 204 and the controller 206, such that the custom-built handheld device 410 is operable to receive and identify the signal from the emitter 202, and subsequently transmit guidance information a user 208.

Optionally, add-on stimulating pad (either by physical spikes or slight electrical pulses) attached to the handheld device 410 may be used for showing additional information such as building maps, exit routes maps, or some crucial facilities' locations, etc.

In this embodiment, the user mobile receiving device 410 is capable of wireless battery charging. For example, the user mobile receiving device 410 may be recharged by placing the user mobile receiving device 410 on an inductive charging station. Alternatively, the user mobile receiving device 410 may include a charging port for recharging the user mobile receiving device 410 with a cabled recharger. This is advantageous that these user mobile receiving devices 410 may be arranged to be deposit in a charging station of a management company of the building premises, and these devices 410 may be readily recharged for lending to use by the general public or visually impaired.

An example embodiment of the system 200 for providing navigation information to a user 208 with visual impairment with reference to FIGS. 2 to 4 is provided below. In this example, a receptor 202 is engaged to user 208, either on the lower part of the user's body or on the guiding post that the user 208 is holding. When the user 208 approaches a location with an emitter 202 placed approximate to the location, a signal is sent to the receptor 204, and the receptor resend the signal to the controller 206. The controller 206 then processes the signal and derives the location of the user 208. In turn, this provides guidance information to the user 208.

The navigation information may includes the existing locality, direction/distance of the next possible destination (lift zone, toilets, public information/service counter, floor plan, staircase, escalator, passenger conveyor, etc.)

In addition, the user 208 may input a destination to the handheld device and the controller 206 may provide direction information to the user 208. The user may follow the direction information so as to arrive the destination. When the user move from positions to positions, the receptor 204 may keep receiving signals emitted from different emitters installed in different locations, and the receptor is also operable to detect if the user is following the direction suggested by the system 200, and provide updated direction information to the user 208 accordingly. Advantageously, continuous signal will be sent to the user for guiding and provided the user with real-time information.

With reference to FIG. 5, there is provided an embodiment of a system 500 for providing navigation information comprising a server 502 which acts as a central coordinator to a plurality of associated emitter 202. The controller module in the handheld device 410 is arranged to derive a location of the proximate object by locating a record associated with referenced location in a database 504 stored in the server. Alternatively, the database may be loaded in the handheld device 410 such that the controller module may locally access the preloaded database.

For example, the reference location may be in form of a digital ID or a signal pattern which needs to be interpreted before a directional or positional guidance can be given. The handheld device 410 may access the database and locate a record associated with the digital ID or the signal pattern detected and derives the location, and transmits the guidance information to the proximate object accordingly.

Without deviating from the spirit of the invention, the system for providing navigation information may also be used by a person with any sensation impairment, or a person without any sensation impairment. In some embodiments, the system can be used for providing navigation information for a user in a building, on the streets, or facilities under the ground, etc.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for providing navigation information comprising:
   a plurality of tactile tiles arranged to provide tactile information to persons with visual impairment;
   a plurality of tags each arranged to emit a signal indicating a reference location of the respective tag, wherein the tags are embedded inside the plurality of tactile tiles and the tags form an array or matrix inside the tactile tile, the tactile tile being provided on a floor surface;
   a guiding post including a reader and a handle attached thereon, wherein the reader is arranged to read the signal emitted from one of the plurality of tags that is proximate to the reader, the handle includes a controller that is operably connected with the reader and is arranged to process the signal to derive a current location of a user holding the guiding post; and a server including a database storing records associated with referenced location, wherein the controller is arranged to derive the current location of the user by locating a record associated with referenced location in the database stored in the server;
   where guidance information is available for the current location of the user, the controller is arranged to transmit the guidance information in a form of an acoustic signal and at least one of a tactile signal, a physical spike or an electrical pulse to a user;
   the system for providing navigation information further comprises:
   an input module arranged to receive an input location;
   wherein the controller is further arranged to process the input location; where direction information is available for the input location, the controller is arranged to transmit the guidance information including the direction information to the user.

2. The system of claim 1, wherein at least four tags form the array or the matrix inside each of the tactile tiles.

3. The system of claim 1, wherein the tactile tiles are provided on the surface in a way that each of the tactile tiles are successively connected with each other.

4. The system of 1, wherein the handle further includes a battery pack integrated in the handle for powering the reader.

5. The system of claim 4, wherein the battery pack includes replaceable or rechargeable battery.

6. The system of claim 1, wherein the controller is integrated with the handle of the guiding post.

7. The system of claim 1, wherein the database stored in the server is accessible to the user via a mobile device.

8. The system of claim 1, wherein the database is loaded in the mobile device.

9. The system of claim 7, wherein the mobile device is a smartphone or a tablet computing device.

10. The system of to claim 1, wherein the signal is emitted through at least one wireless communication protocol.

11. The system of claim 1, wherein the tactile tiles are paved onto a floor.

12. The system of claim 1, wherein the tags emit the signal through at least one wireless communication protocol.

13. The system of claim 1, wherein the reader includes a wireless signal receiver or a wireless communication module.

14. The system of claim 1, wherein the tags are at least one of a permanent magnet, a ferrite core coil, a coreless coil, a magnet media, a magnetic tape, or an array of magnets.

15. The system of claim 1, wherein the reader is at least one of a Hall effect sensor, a magnetic sensor or a micro-electromechanical magnetic sensor.

16. The system of claim 1, wherein the tags are at least one of a barcode, a 2D barcode, a QR code tag, an infra-red signal transmitter or an LED signal transmitter.

17. The system of claim 1, wherein the reader is at least one of optical code reader, a camera, an infra-red receiver or an optical receiver.

18. A tactile tile arranged to provide tactile information to persons with visual impairment, characterized in that, the tactile tile further comprises:

a plurality of tags each arranged to emit a signal indicating a reference location of the respective tag, wherein the tags are embedded inside the tactile tile and the tags form an array or a matrix inside the tactile tile, the tactile tile being provided on a floor surface, wherein the signal is readable by a reader attached on a guiding post when the reader is proximate to at least one of the tags, and the signal is then processed by a controller integrated in a handle being attached on the guiding post, and the controller is operably connecting with the reader to derive a current location of a user holding the guiding post;

wherein the controller is arranged to derive the current location of the user by locating a record associated with referenced location in a database stored in a server;

where guidance information is available for the current location of the user, the controller is arranged to transmit the guidance information in a form of an acoustic signal and at least one of a tactile signal, a physical spike and an electrical pulse to a user;

wherein the controller is further arranged to process an input location received by an input module, such that when direction information is available for the input location, the controller is arranged to transmit the guidance information including the direction information to the user.

19. The tactile tile of claim 18, wherein at least four tags form the array or the matrix inside each tactile tile.

20. The tactile tile of claim 18, wherein the tactile tile is paved onto a floor.

21. The tactile tile of 18, wherein the tags emit the signal through at least one wireless communication protocol.

22. The tactile tile of claim 18, wherein the tags are at least one of a permanent magnet, a ferrite core coil, a coreless coil, a magnet media, a magnetic tape, or an array of magnets.

23. The tactile tile of claim 18, wherein the tags are at least one of a barcode, a 2D barcode, a QR code tag, an infra-red signal transmitter or an LED signal transmitter.

* * * * *